(No Model.)  9 Sheets—Sheet 1.
F. E. STROM.
SUBAQUEOUS VIADUCT.
No. 439,610. Patented Oct. 28, 1890.
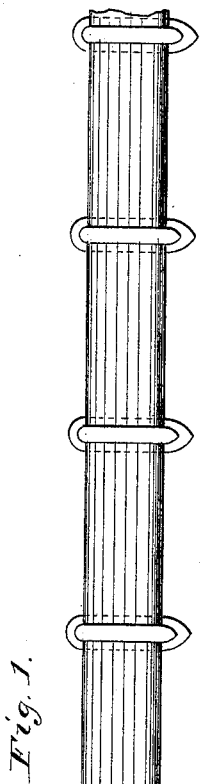
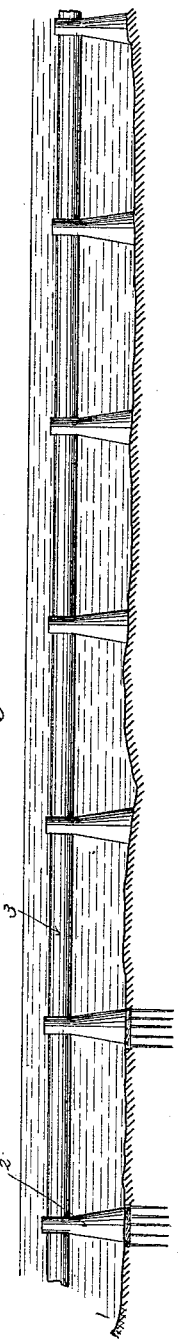
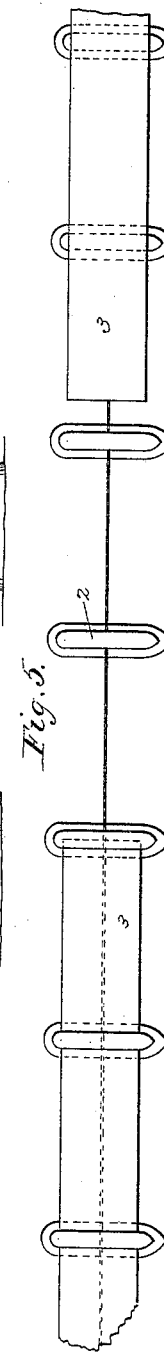
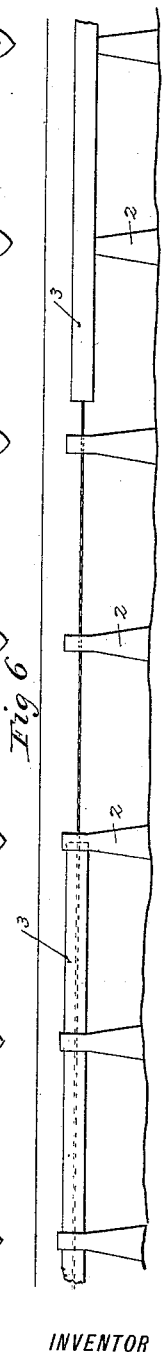
Fig. 1. Fig. 2. Fig. 3. Fig. 4. Fig. 5. Fig. 6.
WITNESSES:
INVENTOR
Fredrik E. Strom
BY
ATTORNEYS.

(No Model.) 9 Sheets—Sheet 2.

F. E. STROM.
SUBAQUEOUS VIADUCT.

No. 439,610. Patented Oct. 28, 1890.

WITNESSES:
R. H. Sanford
C. E. Hunt

INVENTOR
Fredrik E. Strom
By Paul & Merwin
ATTORNEYS.

(No Model.)

F. E. STROM.
SUBAQUEOUS VIADUCT.

No. 439,610. Patented Oct. 28, 1890.

WITNESSES:
R. H. Sanford
C. E. Hunt.

INVENTOR
Fredrik E. Strom
BY
Paul A. Merwin
ATTORNEYS.

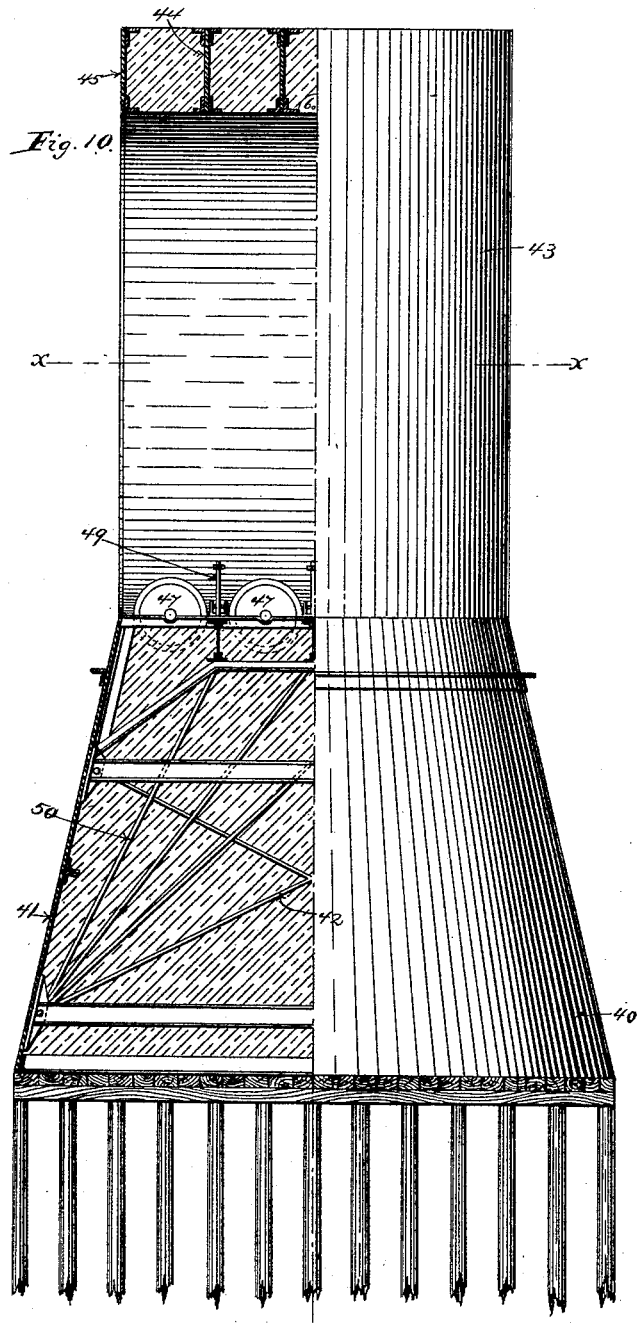

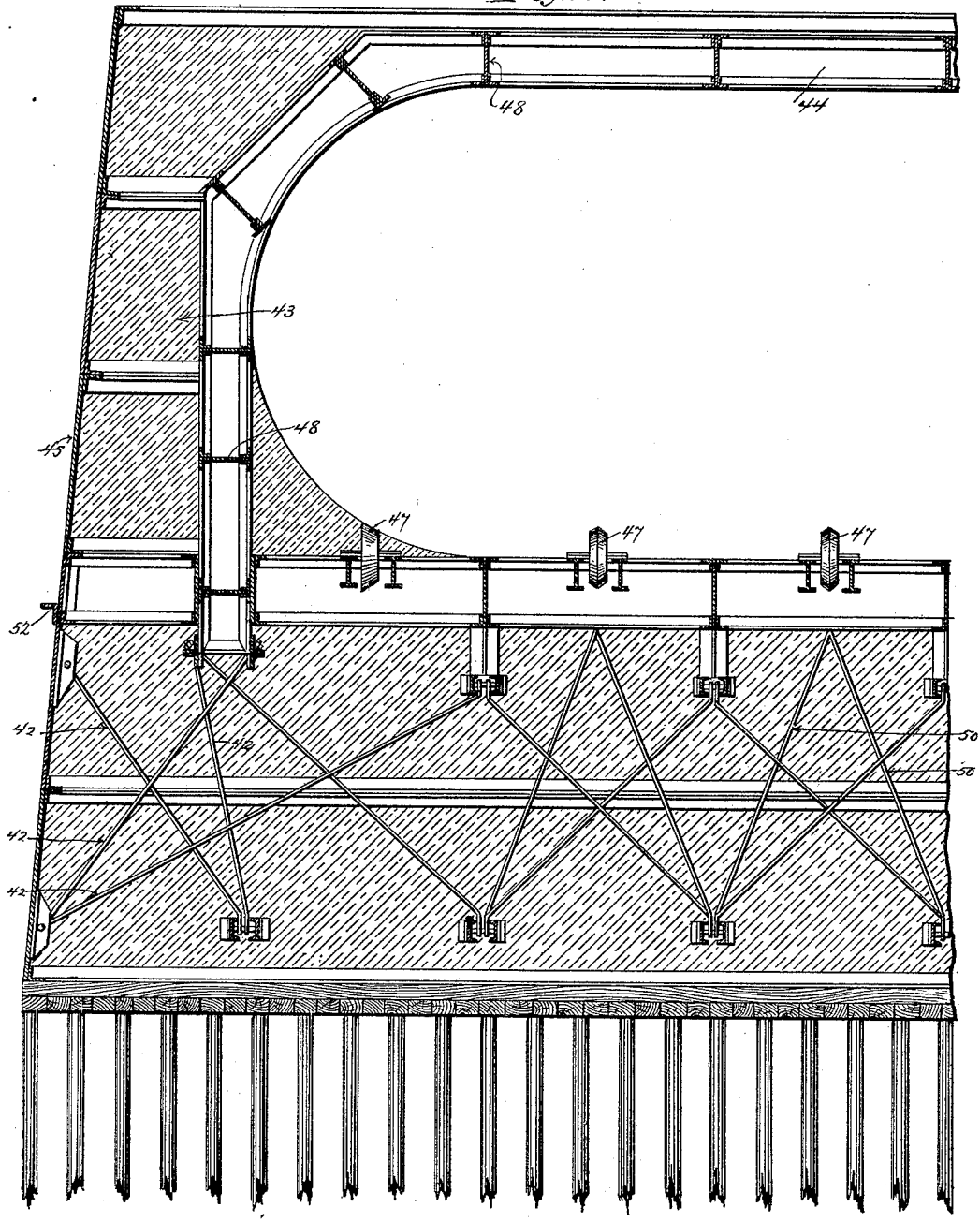

(No Model.) 9 Sheets—Sheet 7.
F. E. STROM.
SUBAQUEOUS VIADUCT.
No. 439,610. Patented Oct. 28, 1890.
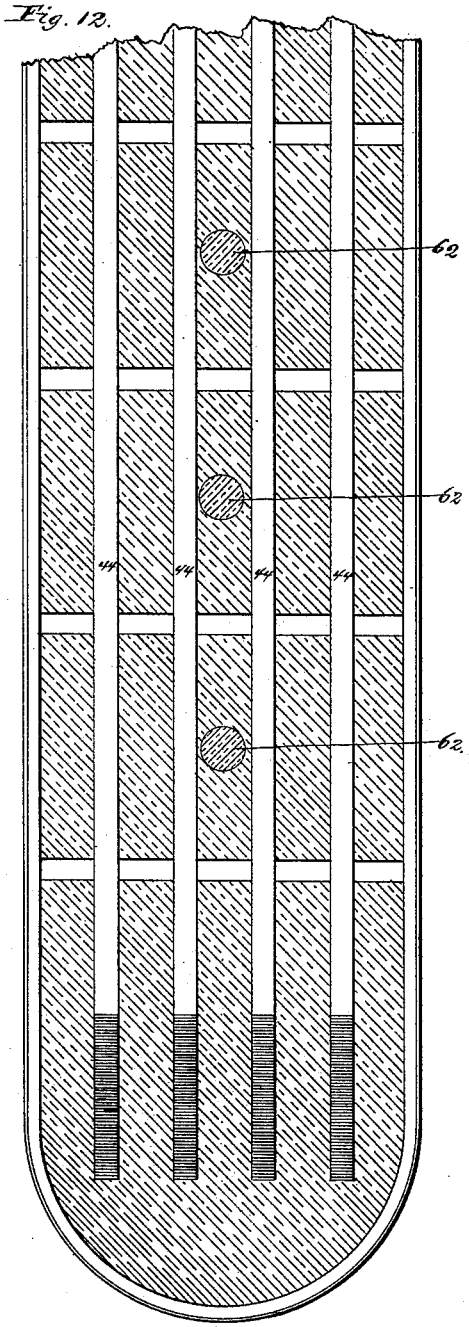
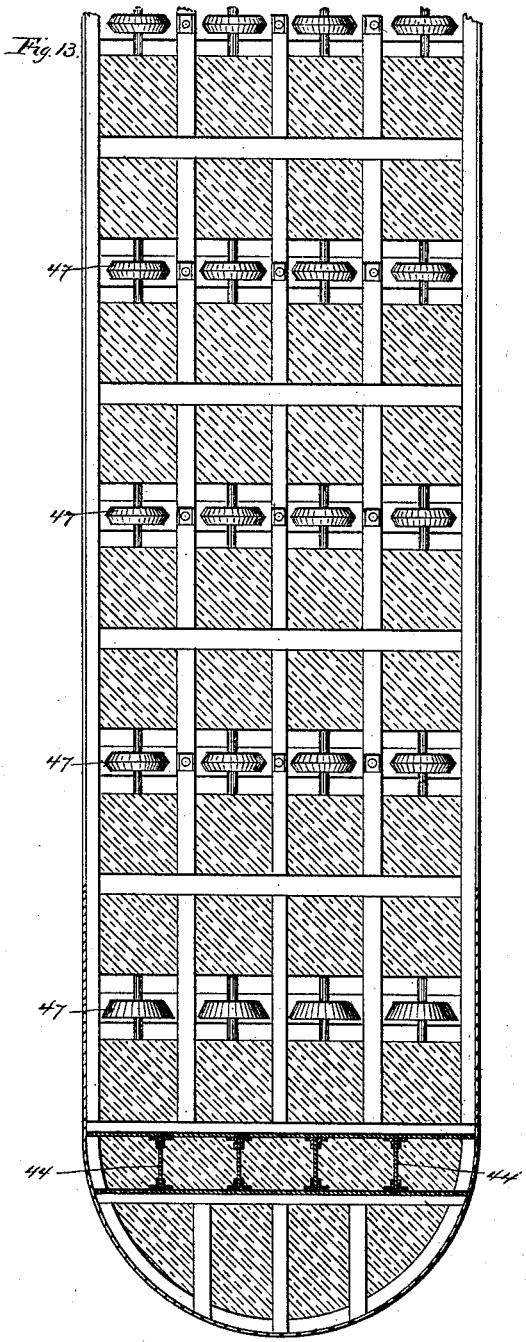
WITNESSES:
R. H. Sanford
C. E. Hunt
INVENTOR
Fredrik E. Strom
BY Paul Merwin
ATTORNEYS.

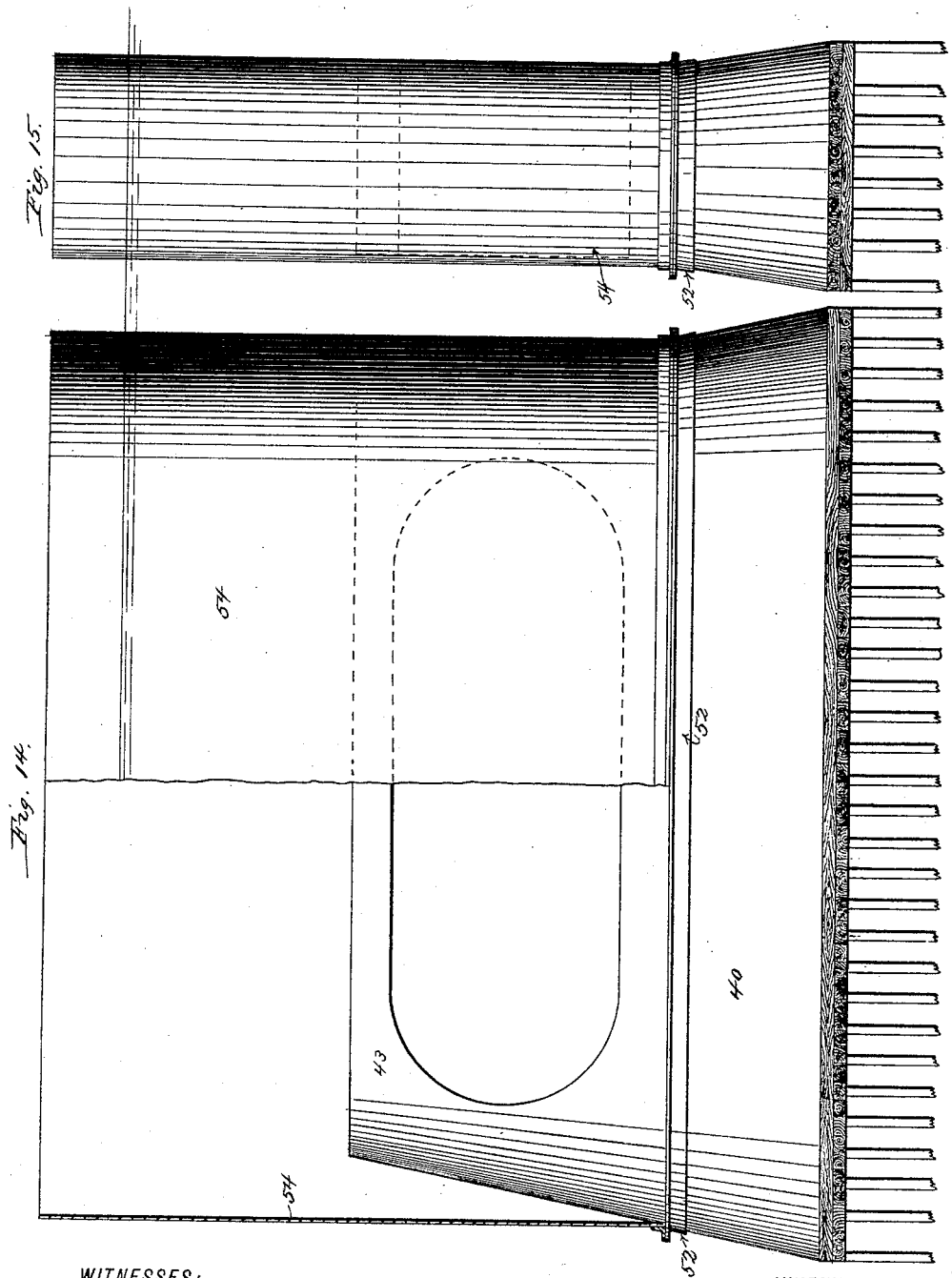

(No Model.)  F. E. STROM.  9 Sheets—Sheet 9.
SUBAQUEOUS VIADUCT.
No. 439,610.  Patented Oct. 28, 1890.
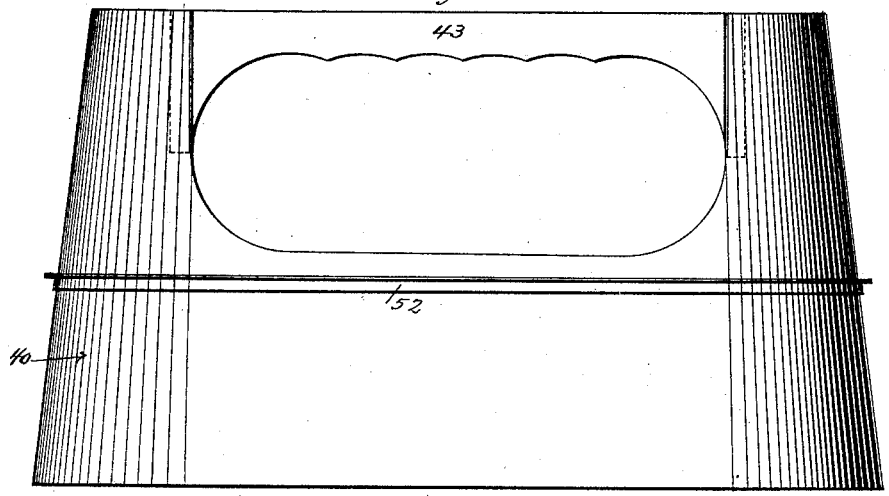
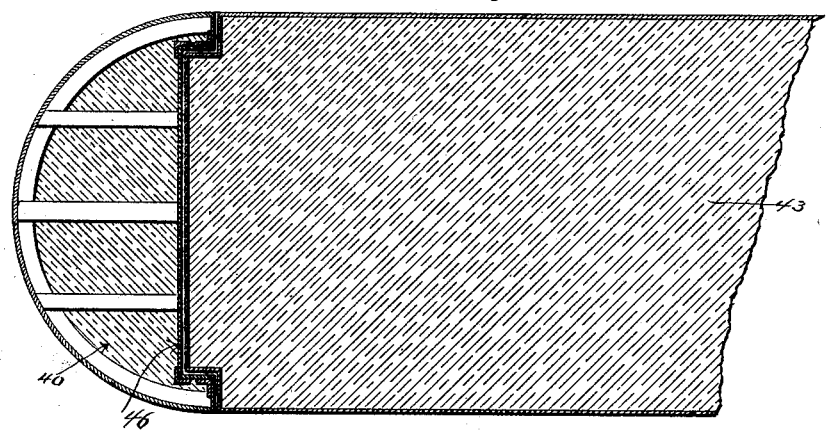

UNITED STATES PATENT OFFICE.

FREDRIK E. STROM, OF MINNEAPOLIS, MINNESOTA, ASSIGNOR OF TWO-THIRDS TO FRANK T. LINDMAN AND JOHN A. HILLIKER, BOTH OF SAME PLACE.

SUBAQUEOUS VIADUCT.

SPECIFICATION forming part of Letters Patent No. 439,610, dated October 28, 1890.

Application filed April 24, 1890. Serial No. 349,260. (No model.)

*To all whom it may concern:*

Be it known that I, FREDRIK E. STROM, of Minneapolis, in the county of Hennepin and State of Minnesota, have invented certain Improvements in Subaqueous Viaducts, of which the following is a specification.

The object of my invention is to construct a viaduct or submarine bridge for transportation purposes under navigable or other water-ways, and to secure the said viaduct upon permanent piers, making the whole structure, when completed, as firm and substantial as an overhead structure for the same requirements. The fact that in submarine structures of this class the displacement of the water assists in carrying the dead load enables me to simplify the construction, so far as the weight-supporting mechanism is concerned, and turn my attention particularly to the preservation of the material and to the thorough and complete exclusion of the water; and to this end my invention consists of a sectional viaduct, a series of piers adapted to receive and secure the several sections, the ends of which are inserted into suitable openings in the said piers and the division line or joint between the two contiguous sections being entirely inclosed by the pier, by which means an absolutely tight joint is obtained.

My invention further consists, generally, in the construction and arrangement hereinafter described, and particularly pointed out in the claims.

Figure 7:
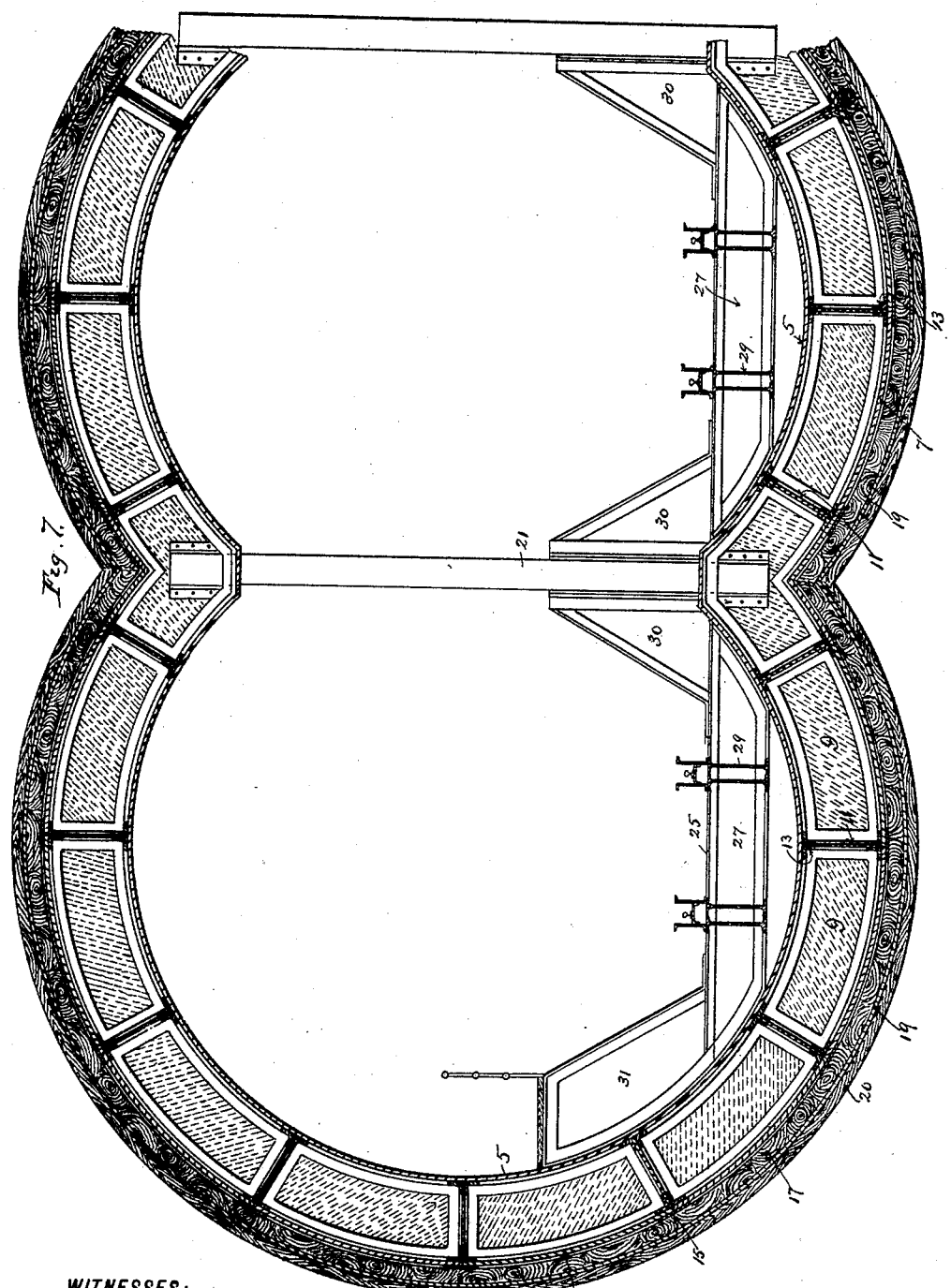
Figure 8:
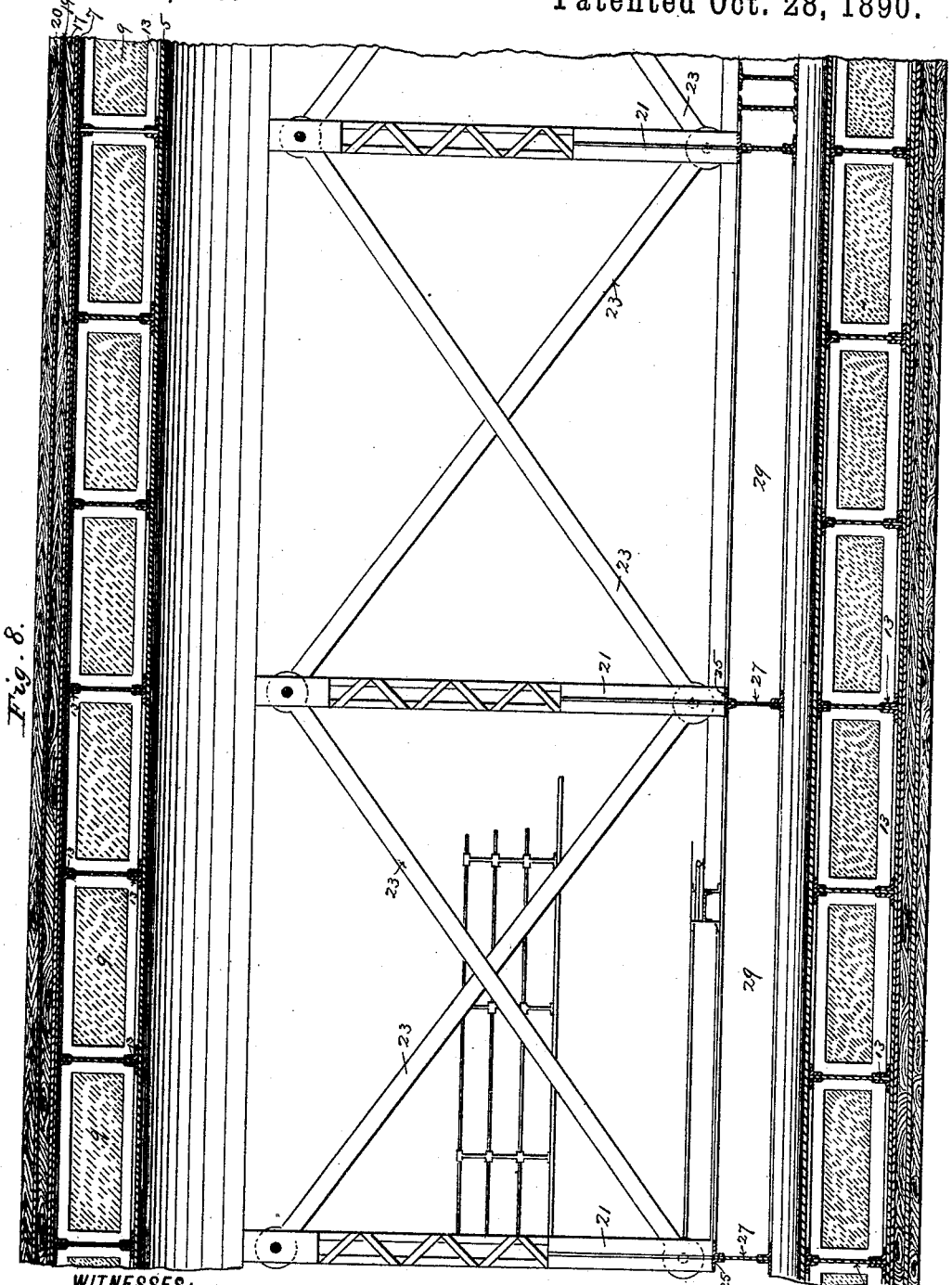
Figure 9:
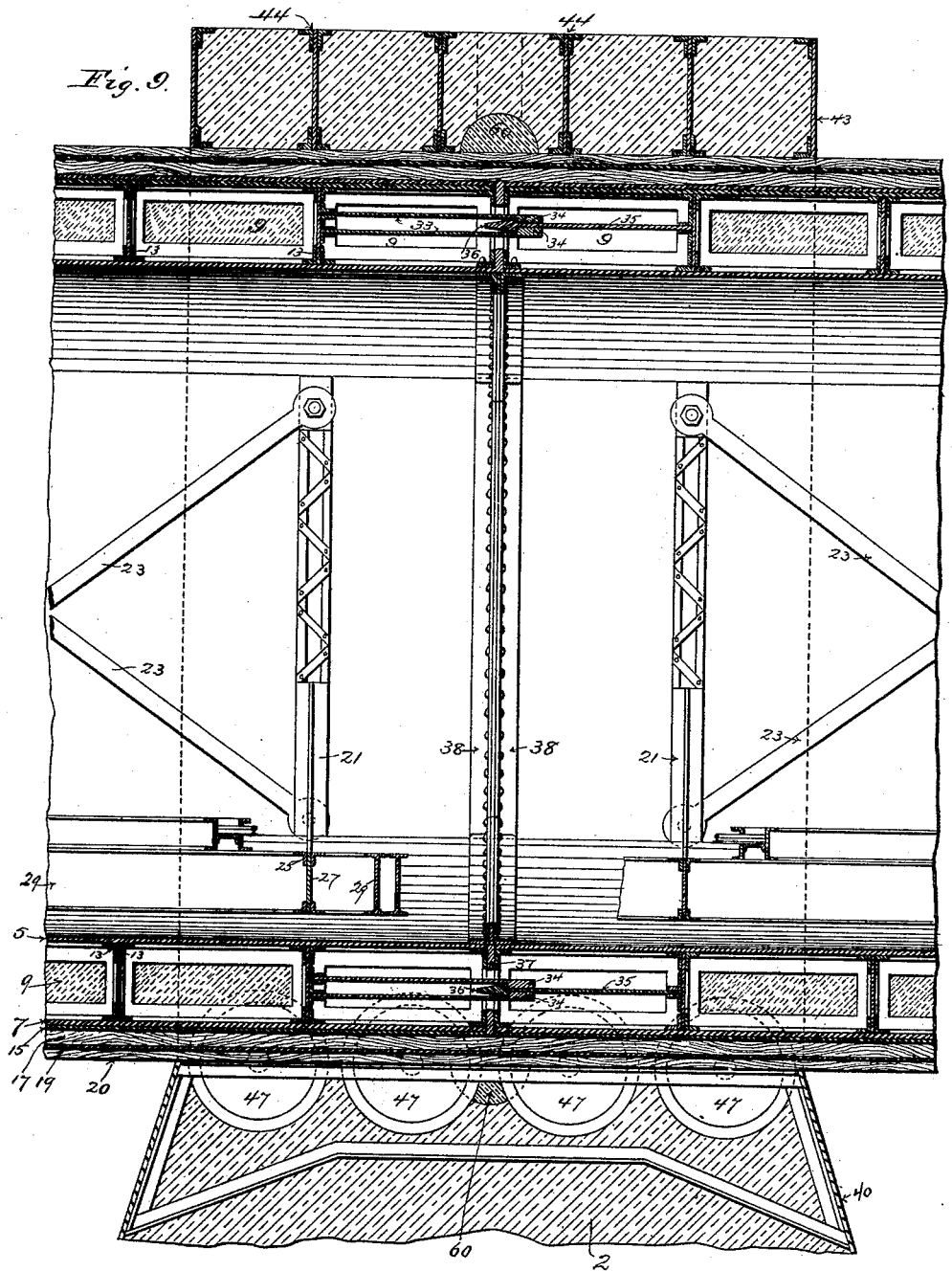

In the drawings, which form part of this specification, Figure 1 is a plan view of a portion of a viaduct constructed in accordance with my improvement. Fig. 2 is a side elevation of the same. Fig. 3 is a cross-section. Fig. 4 is a face view of one of the piers with the viaduct removed. Fig. 5 is a plan view showing the manner of placing the several sections in position. Fig. 6 is a side elevation of the same. Fig. 7 is a vertical cross-section of a portion of the viaduct, on an enlarged scale to more clearly show the construction. Fig. 8 is a vertical longitudinal section of a similar portion. Fig. 9 is also a vertical longitudinal section showing the manner of joining two sections together in the pier. Fig. 10 is an end view and partial vertical section of one of the piers. Fig. 11 is a vertical cross-section of a portion of a pier. Fig. 12 is a plan view of the pier. Fig. 13 is a horizontal section of the pier, taken on line $x\ x$ of Fig. 10. Fig. 14 is a face view and partial section showing the pier with the coffer-dam attached thereto. Fig. 15 is an end elevation of the same. Figs 16 and 17 are views of a pier, showing a modification in the construction of the same.

In the drawings, 2 represents a series of piers, the construction of which will be more fully described hereinafter. These piers may be embedded upon a rock foundation, or where this is not practicable piles may be driven in the ordinary manner until a sufficiently-secure foundation is obtained. The piers are preferably formed with apertures extending through their upper portions for the reception of the sections of the viaduct, which are secured thereto at a uniform depth below the surface of the water, whereby the joints may be made all alike and uniform and the pressure on each part of the viaduct may be the same. The height of the piers from the foundation to the apertures is governed by the depth to which the viaduct is to be submerged. Any required depth for the said viaduct may be maintained and the piers located and built to conform thereto. The main portion of the viaduct is preferably formed in cross section of a series of arcades or arched roadways. As shown in Fig. 7, the side walls of the two outer arcades may be semicircular in form. Any number of these arcades or roadways may be provided. I do not confine myself, however, to this particular form, as other designs may be used without departing from my invention; but I consider this the most satisfactory construction. Longitudinally I prefer to construct the viaduct of a series of sections 3 of any convenient length which may allow the said sections after completion to be transferred to the piers, placed in position, and secured together. The peculiar construction for the several sections which I prefer is as follows: An inner wall 5, preferably of sheet-metal plates properly riveted together and calked to make them water-tight, surrounds the entire viaduct and forms the interior surface thereof. An outer wall 7 of similar construction also extends around the viaduct, and the annular space between these walls is preferably divided into compartments 9 by means of vertical partitions 10 and radial partitions 11. These partitions are preferably secured to the outer and inner walls and also to each other by means of angle-irons 13. Any number of these partitions may be introduced in order to give the proper stability to the walls. I prefer to form the plates comprising the outer wall of such a size that their joints shall correspond with the center of the braces 10 and 11, and a welt-strip 15 is preferably placed over this joint and riveted to the said angle-irons for extra protection and strength.

17 represents a covering, preferably of wood, having the joints and pores filled with some preserving material—such as a preparation of creosote—for the exclusion of the water. This covering rests upon the outer plate 7, and is secured thereto in any convenient manner. A covering-plate 19 may be placed outside the wood covering 17. This covering-plate is preferably formed of some non-corroding material—such as copper—which will not be easily acted upon by the water, and is for the purpose of protecting the wood covering 17 from deterioration from the direct contact with the water and from the effects of insects. It is proposed on account of the extra expense attending the use of this plate to construct it of very thin material, and in order to protect it from being injured while the sections are being adjusted and placed in position I may prefer to provide another outer covering 20 of wood or some other equivalent material, which is secured closely upon the plate 19 in any convenient manner. I prefer to fill the compartments 9 with some suitable cement or concrete, and in this way I obtain a solid wall and prevent the exposure of the surfaces of the plate within the compartments.

21 represents posts or struts placed at suitable intervals throughout the length of the viaduct and along the line of the intersection between each of the several arches. These posts are properly secured by suitable angle-iron braces to the top and bottom walls, and serve as division-supports or compression members between the several arcades. 23 represents vertical braces, preferably secured at the top and bottom of each of the posts, and form the tension-rods for the support of the load.

25 represents floor-beams, which preferably extend transversely of the viaduct and form a support for the railway-rails or for the floor and pavement. The said floor-beams 25 are preferably constructed of upper and lower members composed of angle-irons connected by means of a web or plate 27. The angle-irons comprising the lower members are preferably bent to suit the curve of the inner wall 5, to which they are secured. Suitable longitudinal stringers or I-beams 29 may be introduced between the said floor-beams, to which floor-beams they are secured. Gusset-plates 30 may be secured to the top of the said floor-beams and to the posts 21. At the outer extremities of the floor-beams in the side arches plates 31 may be substituted for the gussets 30, which form a brace from the floor-beam to the inner wall 5, and also furnish a support for a foot passage-way through the viaduct. It will be seen that by the construction of the floor-beams and the braces 30 and 31 attached thereto I am enabled to distribute the strains occasioned by the passing load over a large surface of the wall, and these strains are carried through the posts 21 and braces 23 directly to the upper portions of the viaduct.

In Fig. 9 I have shown the construction at the joint between two sections of the viaduct. A series of clamps are secured to the ends of the sections. Any number of these clamps may be provided, although the number I prefer corresponds with the number of the compartments 9. The end series of these compartments is so arranged that each compartment receives a clamping device, and when the two sections are brought together the clamping process is accomplished within the said compartments and the two end surfaces are brought fairly together, and all projections upon the outer and inner surfaces are avoided. The form of clamps which I prefer to use is composed of two spring-plates 33, extending into one of the compartments 9 and secured at one end to the wall of the said compartment. These plates extend horizontally parallel with each other toward the outer and open end of the compartment, and their free ends are re-enforced to form a latch 34. Secured in a similar manner in the corresponding compartment of the opposite section, I prefer to place a single plate 35, so located as to correspond with the space between the plates 33. The outer or free end of the plate 35 is provided with a wedge-shaped catch 36. As the two sections of the viaduct are brought together, the ends of the latch 34 will receive the wedge-shaped catch 36 and be opened thereby until the shoulder on the said catch passes the projecting latches. When this point is reached, the latches fall behind the said shoulder and the two are securely held together. Any slight variation in position will be accommodated by the spring in the plates 33 and 35. A rubber or other compressible packing-ring 37 may be inserted between the two end surfaces of the sections to prevent leakage at this point when the said sections are first placed together.

Angle-plates 38 are preferably secured at the extremities of the two sections, with their flanges extending inward toward the center of the viaduct. These angle-plates are for the purpose of permanently securing the two sections together, which may be done by bolting or riveting together the two flanges of the said angle-plate, after which any openings in the seam are properly filled and calked, (lead being preferred for this purpose,) and the whole made secure and water-tight.

The pier 2 is preferably constructed as shown in Figs. 10 and 11. A caisson 40, having its side and end walls tapering from the bottom to the top, forms the lower or main section of the said pier and rests upon a suitable foundation. The said walls are preferably composed of sheet-metal plates 41, which are properly riveted and calked, and the caisson is internally provided with suitable horizontal and diagonal braces to give it the requisite strength and resistance while the pier is in process of completion. Rods 42 may also be introduced to take the tension-strain and secure the cap or upper girders to the main portion of the pier. The upper section of cap 43 of the pier preferably consists of a series of girders 44, composed of suitable angle-irons and plates. These girders are preferably made U-shaped inverted, with the two extremities resting upon the main portion of the pier to which they are secured, thus leaving an aperture or opening between the said girders and the upper surface of the caisson for the reception of the sections of the viaduct. When the viaduct is in place, the girders embrace it upon three sides and hold it both laterally and vertically in position. Cross-braces 48 may be inserted at suitable intervals between the girders 44.

The outer wall of the cap or upper portion of the pier is preferably formed of sheet-metal plates 45 in a manner similar to the wall of the caisson, of which it is a continuation, the ends being tapered to correspond with the said caisson, but the sides preferably remaining perpendicular for convenience in construction. The wall of this cap is preferably provided with an aperture at the front and rear, corresponding in size to the cross-section of the viaduct in order to allow the sections of the said viaduct to be passed through this shell and under the girders 44.

I may prefer to construct the cap and pier in such a manner that the said cap can be put in place after the sections of the viaduct are connected together and resting in the pier. In that case I prefer to construct the upper portion of the said pier as shown in Figs. 16 and 17, in which the two ends are extended upward, forming pillars, which guide the sections of the viaduct into place as they are lowered upon the pier. The inner walls of the pillars are preferably constructed with a recess or guideway 46, which receives corresponding projections upon the cap 43, for the purpose of preventing the said cap from becoming displaced. The cap 43 is formed rectangular of suitable plates and bracing, having its lower surface corresponding in shape with the upper surface of the viaduct upon which its rests when inserted in the pier, and securely holds the sections of the said viaduct in place.

To facilitate the movement of the several sections through the piers I prefer to provide conical rollers 47, revolving in suitable bearings and so located upon the main portion of the pier as to correspond with the indentations formed by the intersection of the several arches of the viaduct. Any convenient number of these rollers may be used to properly support the section and avoid friction, and also to allow for the expansion and contraction in the structure.

49 represents stay-bolts arranged to be inserted through the lower walls of the viaduct and secured by suitable nuts and unions to the stay-rods 50, secured to the bottom braces of the pier. These bolts are for the purpose of giving extra security to the sections and prove a safety-stay between the said sections and the pier.

It is proposed to fill the entire pier with concrete after it has been located upon its foundation, and the principal function of the outer shell is to act as a retaining-wall for the concrete during the construction of the pier, and if by any means the outer shell should be removed a concrete pier would still remain of sufficient strength to properly sustain the structure.

In order to complete the alignment and properly construct and complete the upper portion of the pier it is necessary that the water shall be removed from about the said upper portion in order that the workmen may have access to the interior. By the peculiar construction of my pier I am enabled to readily provide means for accomplishing this result. An angle-iron 52 is secured to the outer shell of the caisson 40 and extends completely around it, forming a step to receive the coffer-dam, which is composed of a cylindrical shell 54, which conforms as closely as possible to the form of the caisson at the point of intersection by the angle-iron 52. This coffer-dam is securely fastened by means of bolts or clamps to the angle-iron 52, and extends from the said angle-iron upward to a point above the water-level. A quantity of concrete sufficient to balance the displacement of water by the coffer-dam and pier is inserted into the pier. This will cover the bottom of the caisson and fill all the interstices in and around the foundation. When this concrete has hardened, it will prevent the water from entering the pier, and that which is already in may be easily removed, and access can be had to any part of the pier and the work necessary for the final completion of the upper portion may be carried on without interference. By this arrangement of a coffer-dam in connection with the pier the building of the pier can be done without using compressed air, and the expensive apparatus incident to such operation and the accidents which invariably occur are entirely avoided.

When the work on the pier is completed, the filling process is commenced. Suitable planking is temporarily placed around the interior of the aperture to take the place of the viaduct, and the whole structure can then be completely filled. I prefer to construct a recess 60, formed in the concrete between the two center girders 44. This recess extends around the entire inner surface and conforms in position to that occupied by the joint when the sections are in place. Apertures 62 may be left through the upper wall of concrete, through which the said recess may be filled. When the sections are in place, concrete may be conveyed through these apertures to the recess 60 until it is entirely filled, thus forming a re-enforcement of concrete around the joint, which is thus filled and protected from without.

In order to properly construct a viaduct according to my improvements it will be necessary first to ascertain the formation and profile of the bed of the water-way over which it is to pass. When this is done, the foundation for the several piers is properly located and laid in. The line of the viaduct is then run and the accurate height for the several piers is found and each pier is built to suit its particular height. When this is done, the coffer-dam is secured to the lower portion of the pier and the whole is floated to its proper locality and lowered upon its foundation. The remainder of the pier is then completed and filled with concrete, as before described. When the line of piers is finished, the viaduct is introduced.

If the piers are built with the caps permanently attached thereto, it will be necessary to provide some means for conveying the sections to their proper location, and in Figs. 5 and 6 I have shown a means by which this can be accomplished.

It may not be necessary to have the joint between the section of the viaduct in each pier, and I may prefer to have one section extend over two or more spans, and in order to properly introduce a section of the viaduct it must be brought in line with the apertures in the piers. This is done by omitting the caps on a sufficient number of piers to allow the section to be lowered into proper position, after which said section is propelled in any convenient manner through the apertures in the piers until it has reached its proper destination. The sections are secured together and the space in the pier properly filled and the whole structure is made solid and substantial.

Bulk-heads may be introduced at the extremities of the sections in order to exclude the water, and suitable valves may be provided in the said bulk-heads for admitting, if necessary, sufficient water to properly sink the section.

I claim—

1. A submarine way comprising a series of piers and a submerged viaduct secured upon said piers at a uniform depth below the surface of the water.

2. A submarine way having series of supporting-piers and consisting of a sectional conduit made up of segments of cylinders parallel with each other and joined together at their adjacent edges, and the ends of the sections meeting upon said piers, substantially as described.

3. In a submarine way, a series of piers, a sectional viaduct supported upon and secured to said piers, the joints between the several sections of the viaduct being inclosed by said piers, substantially as described.

4. In a submarine way, a series of piers, a sectional viaduct consisting of a series of arcades, the ends supported in and inclosed by said piers, and means for securing the sections together, substantially as described.

5. In a submarine way, the combination, with a series of permanent piers, of a sectional viaduct supported in and secured by said piers, the arcades or arched roadways composing said viaduct, and a series of struts and tie-bars connecting the upper and lower portions of the said arcades at the point of the intersection of the several arches, substantially as described.

6. In a submarine way, the combination, with a series of permanent piers, of a sectional viaduct supported in and secured by said piers, arcades or arched roadways composing said viaduct, a series of struts and tie-bars connecting the upper and lower members at the intersection of the arches, and a series of guides and clamps for guiding and securing the sections together when introduced into the pier, substantially as described.

7. A submarine viaduct comprising an inner shell or wall in which the roadways are formed, an exterior casing or wall forming a space between it and the inner wall, a filling in said space, a covering to said exterior wall, a non-corroding covering-plate thereto, and a protecting covering to said plate, substantially as described.

8. A viaduct composed of sections provided at their meeting ends with a clamp operating automatically to lock the sections to each other when brought together, substantially as described.

9. A pier formed with an aperture or opening for the reception of the sections of a viaduct and provided with rollers or guides in the bottom of said aperture for the purpose of guiding and supporting said sections, substantially as described.

10. In combination with a submerged pier, a viaduct composed of sections having the contiguous ends thereof lying inside of an opening formed in said pier for said viaduct, substantially as described.

11. A pier comprising the upper and lower sections having an aperture or opening for the sections of the viaduct, and a series of rollers in said aperture revolving in suitable bearings in said lower section, substantially as described.

12. In a submerged pier, a lower or foundation section, an upper or retaining section, said sections formed with an opening for the passage of the viaduct, rollers in the lower surface of said opening, and a viaduct in said opening and resting on said rollers, substantially as described.

13. In a pier, the combination, with a suitable foundation, of a lower hollow pier section or caisson, a cap or upper section resting on said caisson, a viaduct in an aperture in said pier-sections, and a concrete filling within said pier and around said viaduct, substantially as described.

14. In a pier, the combination, with a lower hollow pier-section and a foundation upon which said section rests, of a coffer-dam or removable shell secured to the walls of said section, substantially as described.

15. A pier having an opening or aperture for the passage of a viaduct, sections of a viaduct having their contiguous ends lying in said opening, a recess formed in said pier around the contiguous ends of said sections, and an opening communicating with said recess from the exterior of said pier for the purpose of introducing a filling to protect the joint at the said contiguous ends of the viaduct-sections, substantially as described.

16. A submerged pier formed of a lower section having ways formed therein at its upper end, in combination with an upper section adapted to slide into said ways, the two sections forming an aperture or opening for the reception of a viaduct, substantially as described.

17. A submarine way comprising a series of piers provided with apertures arranged below the surface of the water, and a viaduct composed of a series of sections joined together end to end, and apertures in said piers, substantially as described.

18. The method of forming a subaqueous way, which consists in constructing a series of piers, with apertures through them, beneath the surface of the water, sinking viaduct-sections until they are opposite said apertures, and then moving said sections longitudinally through said apertures to the desired position.

In testimony whereof I have hereunto set my hand this 19th day of April, 1890.

FREDRIK E. STROM.

In presence of—
R. H. SANFORD,
JAMES M. FREEMAN.